US007894034B2

(12) United States Patent
Park

(10) Patent No.: US 7,894,034 B2
(45) Date of Patent: Feb. 22, 2011

(54) THIN FILM TRANSISTOR ARRAY PANEL WITH IMPROVED CONNECTION TO TEST LINES HAVING AUXILIARY TEST LINE WITH PLURAL EXTENDING CONDUCTIVE LAYERS IN CONTACT WITH AT LEAST ONE TEST LINE

(75) Inventor: Jung-Woo Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/535,547

(22) Filed: Aug. 4, 2009

(65) Prior Publication Data

US 2009/0296039 A1 Dec. 3, 2009

Related U.S. Application Data

(63) Continuation of application No. 11/268,877, filed on Nov. 7, 2005, now Pat. No. 7,626,670.

(30) Foreign Application Priority Data

Nov. 8, 2004 (KR) ...................... 10-2004-0090375

(51) Int. Cl.
*G02F 1/1345* (2006.01)

(52) U.S. Cl. ....................................... 349/149; 349/152

(58) Field of Classification Search ................... 349/40, 349/149–152

See application file for complete search history.

(56) References Cited

U.S. PATENT DOCUMENTS 5,781,253 A 7/1998 Koike et al.
6,084,648 A 7/2000 Yeo
2002/0021376 A1 2/2002 Yoo et al.
2002/0027621 A1 3/2002 Chae
2003/0075718 A1 4/2003 Jang et al.
2004/0119925 A1 6/2004 Moon

FOREIGN PATENT DOCUMENTS

CN 1495498 A 5/2004
CN 1503040 A 6/2004
KR 1019980010531 4/1998
KR 1020020006748 1/2002

(Continued)

OTHER PUBLICATIONS

English Abstract for KR Pat. Pub. No. 1020020006748.

(Continued)

*Primary Examiner*—John Heyman
(74) *Attorney, Agent, or Firm*—Innovation Counsel LLP

(57) ABSTRACT

A thin film transistor (TFT) array panel with improved contact between the display signal lines and test lines is presented. The TFT array panel includes: gate lines and data lines intersecting each other, switching elements connected to the gate lines and the data lines, and at least one test line disposed near end portions of the gate lines or the data lines. An insulating layer covers the gate lines, the data lines and the switching elements and has first contact holes exposing the end portions of the gate lines or the data lines and second contact holes exposing the test lines. Auxiliary test lines are formed on the insulating layer and commonly connected to conductive layers, wherein the conductive layers connect at least one test line to the gate lines or the data lines via the first and the second contact holes.

20 Claims, 9 Drawing Sheets

FOREIGN PATENT DOCUMENTS

| | | | |
|---|---|---|---|
| KR | 1020020018849 | | 3/2002 |
| KR | 1020030054937 | | 7/2003 |
| KR | 1020040060044 | | 7/2004 |
| WO | 2004/027868 | A2 | 4/2004 |

OTHER PUBLICATIONS

English Abstract for KR Pat. Pub. No. 1020040060044.
English Abstract for KR Pat. Pub. No. 1020020018849.
English Abstract for KR Pat. Pub. No. 1019980010531.
English Abstract for KR Pat. Pub. No. 1020030054937.

THIN FILM TRANSISTOR ARRAY PANEL WITH IMPROVED CONNECTION TO TEST LINES HAVING AUXILIARY TEST LINE WITH PLURAL EXTENDING CONDUCTIVE LAYERS IN CONTACT WITH AT LEAST ONE TEST LINE

CROSS-REFERENCE TO RELATED APPLICATIONS

The present application is a continuation application of U.S. patent application Ser. No. 11/268,877 filed on Nov. 7, 2005 now U.S. Pat. No. 7,626,670 which claims the benefit of Korean Patent Application No. 10-2004-0090375 filed on Nov. 8, 2004, the content of which is incorporated by reference herein in its entirety.

BACKGROUND OF THE INVENTION (a) Field of the Invention

The present invention relates to a thin film transistor array panel with improved connection to test lines.

(b) Description of Related Art

Recently, flat panel displays such as organic light emitting diode ("OLED") displays, plasma display panels ("PDPs"), and liquid crystal displays ("LCDs") have been receiving much attention as possible replacements for the heavy and large cathode ray tubes ("CRTs").

The PDPs are devices which display characters or images using plasma generated by gas-discharge. The OLED displays are devices which display characters or images by applying an electric field to specific light-emitting organics or high molecule materials. The LCDs are devices which display images by applying an electric field to a liquid crystal layer disposed between two panels and regulating the strength of the electric field to adjust the transmittance of light passing through the liquid crystal layer.

Among the flat panel displays, the LCD and the OLED display each includes a lower panel provided with pixels including switching elements and display signal lines, an upper panel provided with color filters, and a plurality of circuitry elements.

When the display signal lines are disconnected in the process of manufacturing the display device, the disconnection is detected via predetermined tests. Such tests include an array test, a visual inspection (VI) test, a gross test, a module test, and so on.

The array test is used to detect the disconnection of the display signal lines by applying predetermined voltages and sensing whether output voltages are generated or not before a mother glass is divided into separate cells. The VI test is used to detect the disconnection of the display signal lines by applying predetermined voltages to view the panels after the mother glass is divided into separate cells. The gross test is used to determine the image quality and connection status of the display signal lines by applying predetermined voltages to view display states of a screen before mounting driving circuits thereon. Typically, the predetermined voltages are applied after combining the lower panel and the upper panel. The module test is used to determine the optimum operation of the driving circuits after mounting the driving circuits thereon.

The display signal lines are divided into several groups to be tested in the array test and the VI test, and the gross test and the module test are performed in a condition similar to real operation circumstances. For the array test and the VI test, a test line is connected to each group. An end portion of the test line has a large area, which is called a pad, and a test signal is applied to the pad. In this case, the display signal lines and the test line are connected using a conductive layer disposed in a layer different from the display signal lines and the test lines.

However, poor contact occurs among the display signal lines, the test lines and the conductive layer. The poor contact may be caused by etching with an etchant in the process of manufacturing, thereby disconnecting the signal lines from the conductive layer. A method of achieving a better contact between the signal lines and the test line is desired.

SUMMARY OF THE INVENTION

The present invention provides a thin film transistor array panel that is capable of solving the above problem.

In one aspect, the invention is a thin film transistor array panel that includes a plurality of gate lines, a plurality of data lines intersecting the gate lines, a plurality of switching elements respectively connected to the gate lines and the data lines, and a plurality of pixel electrodes respectively connected to the switching elements. At least one test line is disposed near the end portions of the gate lines or the data lines. An insulating layer covers the gate lines, the data lines, and the switching elements, and has a plurality of first contact holes exposing the end portions of the gate lines or the data lines and a plurality of second contact holes exposing the test lines. A plurality of auxiliary test lines are formed on the insulating layer and commonly connected to the a plurality of conductive layers to be formed, wherein the conductive layers connect at least one test line to the gate lines or the data lines via the first and the second contact holes.

The gate lines or the data lines may have expansions, and the test lines may have protrusions corresponding to the expansions.

The first and the second contact holes may expose border lines of the expansions and the protrusions.

The conductive layers may completely cover the first and the second contact holes.

The test lines may include first and second test lines, and, herein the first test lines may be commonly connected to odd gate lines via the conductive layers coupled to the odd gate lines, and the second test lines may be commonly connected to even gate line via the conductive layers coupled to the even gate lines, and, herein the auxiliary test lines comprise first auxiliary test lines connecting the conductive layers coupled to the odd gate lines to each other and second auxiliary test lines connecting the conductive layers coupled to the even gate lines to each other.

The protrusions of the first and the second test lines may protrude in the same direction toward the end portions of the gate lines.

Alternatively, the protrusions of the first and the second test lines may protrude in directions opposite of each other.

The auxiliary test lines may be formed on the same layer as the pixel electrodes.

The test lines may be formed on the same layer as the gate lines.

In another aspect, the invention is a liquid crystal display that includes a plurality of gate lines, a plurality of data lines intersecting the gate lines, a plurality of switching elements respectively connected to the gate lines and the data lines, and a plurality of pixel electrodes respectively connected to the switching elements. At least one test line is disposed near the end portions of the gate lines or the data lines. A plurality of auxiliary test lines commonly connected to a plurality of conductive layers, wherein the conductive layers connect at least one test line to the gate lines or the data lines via the first and the second contact holes.

BRIEF DESCRIPTION OF THE DRAWINGS

The present invention will become more apparent by describing embodiments thereof in detail with reference to the accompanying drawings, in which.

DETAILED DESCRIPTION OF EMBODIMENTS

Figure 1:
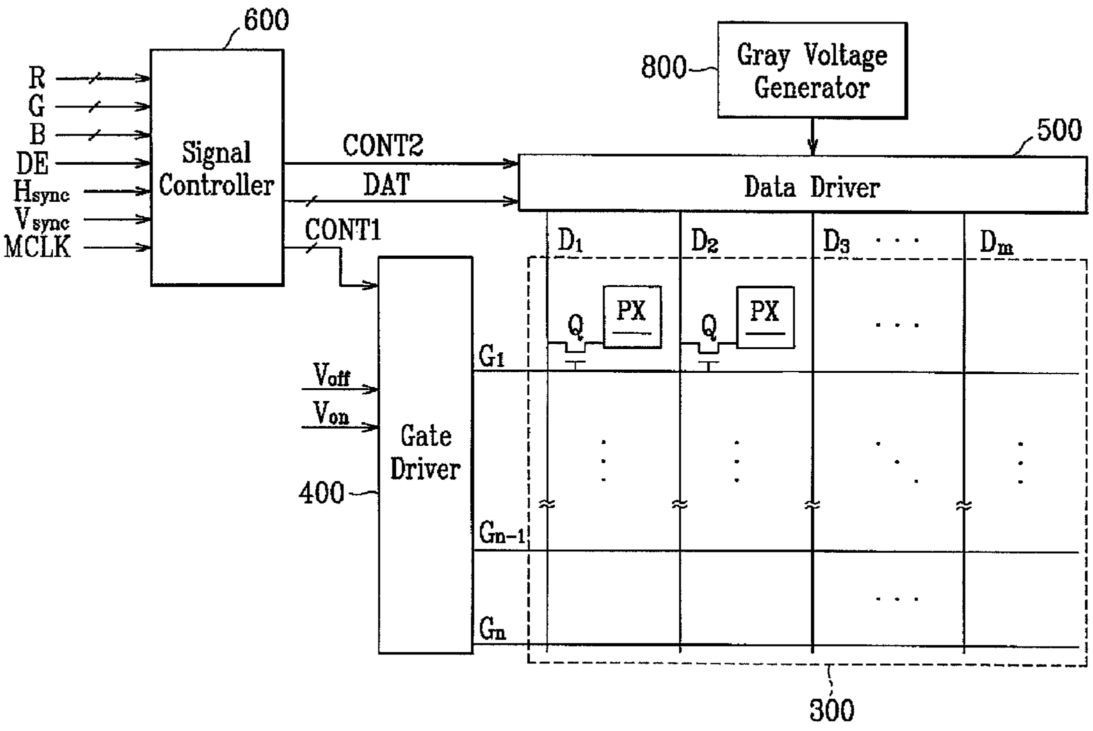
FIG. 1 is a block diagram of an LCD according to an exemplary embodiment of the present invention.

The present invention will be described more fully hereinafter with reference to the accompanying drawings, in which preferred embodiments of the invention are shown. This invention may, however, be embodied in many different forms and should not be construed as limited to the embodiments set forth herein. Like numerals refer to like elements throughout.

In the drawings, the thickness of layers and regions are exaggerated for clarity. Like numerals refer to like elements throughout. It will be understood that when an element such as a layer, region, or substrate is referred to as being "on" another element, it can be directly on the other element or intervening elements may also be present.

A display device according to embodiments of the present invention will now be described with reference to the accompanying drawings.

Figure 2:
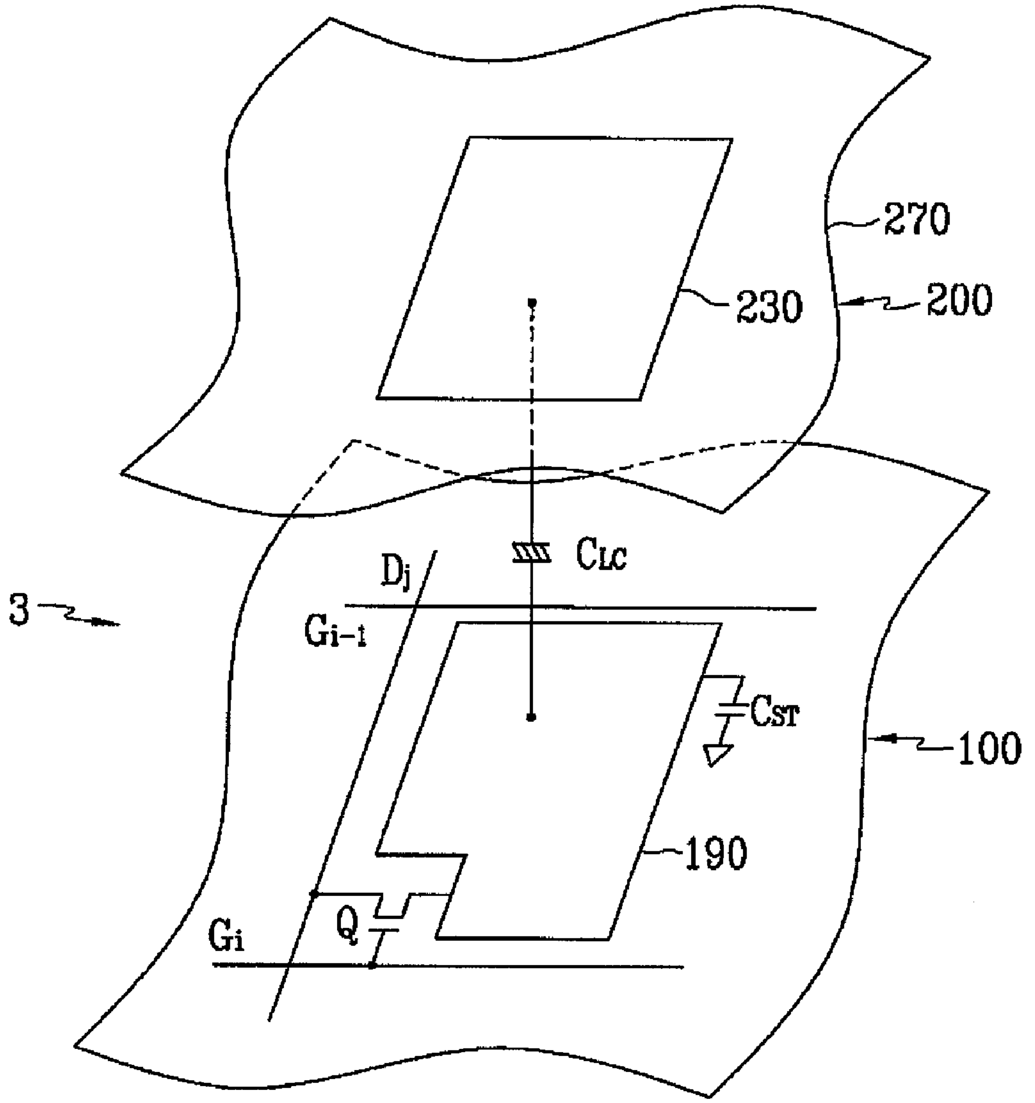
FIG. 2 is an equivalent circuit diagram of a pixel of an LCD according to an exemplary embodiment of the present invention.

FIG. 1 is a block diagram of a display device according to an embodiment of the present invention, and FIG. 2 illustrates a structure and an equivalent circuit diagram of a pixel of an LCD according to an exemplary embodiment of the present invention.

Referring to FIG. 1, a display device according to an exemplary embodiment of the present invention includes a panel assembly 300, a gate driver 400 and a data driver 500 connected thereto, a gray voltage generator 800 connected to the data driver 500, and a signal controller 600 that controls the above-described elements.

The panel assembly 300 includes a plurality of display signal lines $G_1$-$G_n$ and $D_1$-$D_m$ and a plurality of pixels connected to the display signal lines $G_1$-$G_n$ and $D_1$-$D_m$ and arranged substantially in a matrix structure. The panel assembly 300 includes a lower panel 100 and an upper panel 200.

The display signal lines $G_1$-$G_n$ and $D_1$-$D_m$ are provided on the lower panel 100 and include gate lines $G_1$-$G_n$ transmitting gate signals (called scanning signals) and data lines $D_1$-$D_m$ transmitting data signals. The gate lines $G_1$-$G_n$ extend substantially in a first direction and are substantially parallel to each other, while the data lines $D_1$-$D_m$ extend substantially in a second direction and are substantially parallel to each other. The first direction and the second direction are substantially perpendicular to each other.

Each pixel includes a switching element Q connected to one of the gate lines $G_1$-$G_n$ and one of the data lines $D_1$-$D_m$, and pixel circuits PX connected to the switching element Q. The switching element Q is provided on the lower panel 100 and has three terminals: a control terminal connected to one of the gate lines $G_1$-$G_n$; an input terminal connected to one of the data lines $D_1$-$D_m$; and an output terminal connected to the pixel circuit PX.

In active matrix type LCDs, which are an example of a flat panel display device, the panel assembly 300 includes the lower panel 100, the upper panel 200, a liquid crystal (LC) layer 3 disposed between the lower and upper panels 100 and 200, and the display signal lines $G_1$-$G_n$ and $D_1$-$D_m$ and the switching elements Q that are provided on the lower panel 100. Each pixel circuit PX includes an LC capacitor $C_{LC}$ and a storage capacitor $C_{ST}$ that are connected in parallel with the switching element Q. The storage capacitor $C_{ST}$ may be omitted if it is not needed.

The LC capacitor $C_{LC}$ includes a pixel electrode 190 on the lower panel 100, a common electrode 270 on the upper panel 200, and the LC layer 3 as a dielectric between the pixel and common electrodes 190 and 270. The pixel electrode 190 is connected to the switching element Q, and the common electrode 270 covers the entire surface of the upper panel 200 and is supplied with a common voltage Vcom. Alternatively, both the pixel electrode 190 and the common electrode 270, which have shapes of bars or stripes, are provided on the lower panel 100.

The storage capacitor $C_{ST}$ is an auxiliary capacitor for the LC capacitor $C_{LC}$. The storage capacitor $C_{ST}$ includes the pixel electrode 190 and a separate signal line (not shown), which is provided on the lower panel 100 and overlaps the pixel electrode 190 with an insulator disposed between the pixel electrode 190 and the separate signal line. The storage capacitor $C_{ST}$ is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 with an insulator disposed between the pixel electrode 190 and the previous gate line.

For color display, each pixel represents one of three primary colors such as red, green, and blue at all times (spatial division), or sequentially represents the three primary colors at different times (temporal division), thereby obtaining a desired color. FIG. 2 shows an example of the spatial division in which each pixel includes a color filter 230 representing one of the three primary colors in an area of the upper panel 200 facing the pixel electrode 190. Alternatively, the color filter 230 may be provided on or under the pixel electrode 190 on the lower panel 100.

A pair of polarizers (not shown) for polarizing light are attached on outer surfaces of the lower and upper panels 100 and 200 of the panel assembly 300.

Referring back to FIG. 1, a gray voltage generator 800 generates one set or two sets of gray voltages related to light transmittance through the pixels. When two sets of the gray voltages are generated, the gray voltages in one set have a positive polarity with respect to the common voltage Vcom, while the gray voltages in the other set have a negative polarity with respect to the common voltage Vcom.

The gate driver 400 is connected to the gate lines $G_1$-$G_n$ of the panel assembly 300 and synthesizes the gate-on voltage Von and the gate-off voltage Voff from an external device to generate gate signals for application to the gate lines $G_1$-$G_n$. The gate driver 400 is a shift register, which includes a plurality of stages in a line.

The data driver 500 is connected to the data lines $D_1$-$D_m$ of the panel assembly 300 and applies data voltages, which are selected from the gray voltages supplied from the gray voltage generator 800, to the data lines $D_1$-$D_m$.

The signal controller 600 controls the gate driver 400 and the data driver 500.

Now, the operation of the display device will be described in detail referring to FIG. 1.

The signal controller 600 is supplied with image signals R, G, and B and input control signals controlling the display of the image signals R, G, and B, from an external graphic controller (not shown). The input control signals include, for example, a vertical synchronization signal Vsync, a horizontal synchronization signal Hsync, a main clock MCLK, and a data enable signal DE. After generating gate control signals CONT1 and data control signals CONT2 and processing the image signals R, G, and B to be suitable for the operation of the panel assembly 300 in response to the input control signals, the signal controller 600 provides the gate control signals CONT1 to the gate driver 400, and the processed image signals DAT and the data control signals CONT2 to the data driver 500.

The gate control signals CONT1 include a vertical synchronization start signal STV for informing the gate driver of the start of a frame, a gate clock signal CPV for controlling an output time of the gate-on voltage Von, and an output enable signal OE for defining a width of the gate-on voltage Von.

The data control signals CONT2 include a horizontal synchronization start signal STH for informing the data driver 500 of the start of a horizontal period, a load signal LOAD or TP for instructing the data driver 500 to apply the appropriate data voltages to the data lines $D_1$-$D_m$, and a data clock signal HCLK. The data control signals CONT2 may further include an inversion control signal RVS for reversing the polarity of the data voltages (with respect to the common voltage Vcom).

The data driver 500 receives the processed image signals DAT for a pixel row from the signal controller 600 and converts the processed image signals DAT into the analogue data voltages selected from the gray voltages supplied from the gray voltage generator 800 in response to the data control signals CONT2 from the signal controller 600.

In response to the gate control signals CONT1 from the signal controller 600, the gate driver 400 applies the gate-on voltage Von to the gate lines $G_1$-$G_n$, thereby turning on the switching elements Q connected to the gate lines $G_1$-$G_n$.

The data driver 500 applies the data voltages to corresponding data lines $D_1$-$D_m$ for a turn-on time of the switching elements Q (which is called "one horizontal period" or "1H" and equals one period of the horizontal synchronization signal Hsync, the data enable signal DE, and the gate clock signal CPV). The data voltages in turn are supplied to corresponding pixels via the turned-on switching elements Q.

The difference between the data voltage and the common voltage Vcom applied to a pixel is expressed as a charged voltage of the LC capacitor $C_{LC}$, i.e., a pixel voltage. The liquid crystal molecules have orientations depending on a magnitude of the pixel voltage and the orientations determine a polarization of light passing through the LC capacitor $C_{LC}$. The polarizers convert light polarization into light transmittance.

By repeating the above-described procedure, all gate lines $G_1$-$G_n$ are sequentially supplied with the gate-on voltage Von during a frame, thereby applying the data voltages to all pixels. In case of the LCD shown in FIG. 1, when a next frame starts after finishing one frame, the inversion control signal RVS applied to the data driver 500 is controlled such that a polarity of the data voltages is reversed ("frame inversion"). The inversion control signal RVS may be controlled such that the polarity of the data voltages flowing in a data line in one frame is reversed (e.g.: "row inversion", "dot inversion"), or the polarity of the data voltages in one packet is reversed (e.g.: "column inversion", "dot inversion").

A detailed example of the LCD shown in FIGS. 1 and 2 is now described with reference to FIG. 3.

Figure 3:
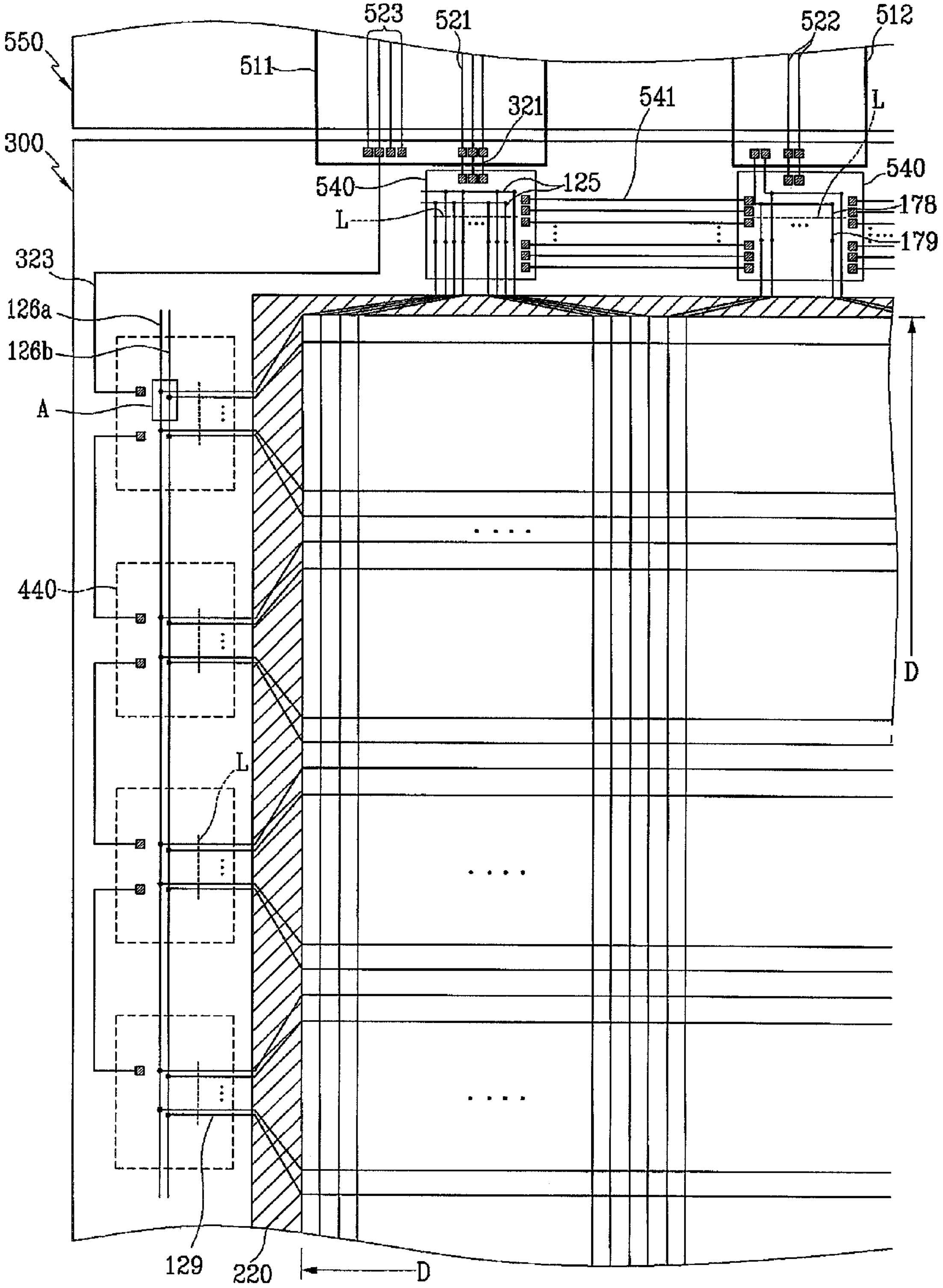
FIG. 3 is a schematic layout view of an LCD according to an embodiment of the present invention.

FIG. 3 is a schematic layout view of an LCD according to an embodiment of the present invention.

As shown in FIG. 3, a panel assembly 300 includes a plurality of gate lines 121 ($G_1$-$G_n$) and a plurality of data lines 171 ($D_1$-$D_m$). A plurality of gate driving IC chips 440 and a plurality of data driving IC chips 540 are mounted on the panel assembly 300. The gate driving IC chips 440 are disposed near a left edge of the panel assembly 300, and the data driving IC chips 540 are disposed near a top edge of the panel assembly 300. A PCB 550 is disposed near a top edge of the panel assembly 300 and several circuit elements such as a signal controller 600 and a gray voltage generator 800 are provided thereon. The panel assembly 300 and the PCB 550 are electrically and physically interconnected by a plurality of FPC films 511 and 512.

The leftmost FPC film 511 includes a plurality of data transmission lines 521 and a plurality of driving signal lines 523. The data transmission lines 521 for transmitting image data are connected to input terminals of the data driving IC chips 540. The driving signal lines 523 transmit electrical voltages and control signals for activating the driving IC chips 540 and 440 via driving signal lines 323 and leads 321 disposed on the panel assembly 300.

The remaining FPC films 512 include a plurality of driving signal lines 522 transmitting electrical voltages and control signals to the data driving IC chips 540 electrically connected thereto.

The signal lines 521-523 are connected to the circuit elements on the PCB 550 and receive signals therefrom.

In other embodiments, the driving signal lines 523 may be provided on a separate FPC film (not shown).

As shown in FIG. 3, a plurality of pixel areas defined by the intersections of the gate lines extending in the first direction and the data lines extending in the second direction form a display area D on the panel assembly 300. A light blocking member 220 (indicated by a hatched area) for blocking light leakage exterior to the display area D is disposed around the display area D.

Although the gate lines extend substantially parallel to each other and the data lines extend substantially parallel to each other in the display area D, there is a fan-out area around the display area D where the gate lines are not parallel to each other and the data lines are not parallel to each other. As shown in FIG. 3, the fan-out area is located between two regions where the gate lines are parallel to each other and the data lines are parallel to each other. The separation distances between the parallel signal lines in the two regions are different, and the fan-out region is where the separation distances are adjusted for the signal lines on a group-by-group basis.

The data driving IC chips 540 are disposed outside of the display area D and are sequentially arranged in the first direction. Adjacent data driving IC chips 540 are connected by a plurality of interconnections 541, and the image data transmitted from the leftmost FPC film 511 to the leftmost data driving IC 540 are then transmitted to the next data driving IC 540 via the interconnections 541, and so on.

A plurality of data VI test lines 125 are formed on the panel assembly 300, and two data VI test lines 125 are disposed under each of the data driving IC chips 540. Each of the data VI test lines 125 extends substantially in the first direction and includes an inspection pad (not shown). The data lines are alternately connected to the data VI test lines 125. The number of the data VI test lines 125 may be varied. As shown in FIG. 3, one of two data VI test lines 125 is connected to the odd data lines $D_1$, $D_3$, . . . , and the other of two data VI test lines 125 is connected to the even data lines $D_2$, $D_4$, . . . .

The gate driving IC chips 440 are mounted near the left edges of the panel assembly 300 external to the display area D and arranged in the second direction. The driving signal lines 323 are located near the gate driving IC chips 440 and electrically connect the driving signal lines 523 of the leftmost FPC film 511 to the uppermost gate driving IC 440 or electrically connect the gate driving IC chips 440. The gate driving IC chips 440 may be formed on the lower assembly 100 along with the switching element or the driving signal lines 323, such that it may include a plurality of thin film transistors and a plurality of signal lines, unlike the structure of FIG. 3.

Additionally, a plurality of gate VI test lines **126*a* and 126*b* are formed on the panel assembly 300, and two gate VI test lines 126*a* and 126*b* are disposed under each of the gate driving IC chips 440. Each of the gate VI test lines 126*a* and 126*b* extends substantially in the second direction and includes an inspection pad (not shown). The gate lines are connected to the different gate VI test lines 126*a* 126*b* in an alternating manner. In the embodiment of FIG. 3, one of two gate VI test lines 126*a* and 126*b* is connected to the odd gate lines $G_1$, $G_3$, . . . , and the other of two gate VI test lines 126*a* and 126*b*** is connected to the even data lines $G_2$, $G_4$, . . . .

The reference numeral "L" in FIG. 3 represents a cutting line irradiated by laser to individually electrically disconnect the gate lines 121 and the data lines 171 from each other in a final step of the manufacturing process.

As described above, the LC panel assembly 300 includes the two panels 100 and 200, and one of the panels 100 and 200 provided with the TFTs is referred to as a "TFT array panel."

An exemplary TFT array panel for an LCD according to an embodiment of the present invention is now described in detail with reference to FIGS. 4-8 as well as FIG. 3.

Figure 4:
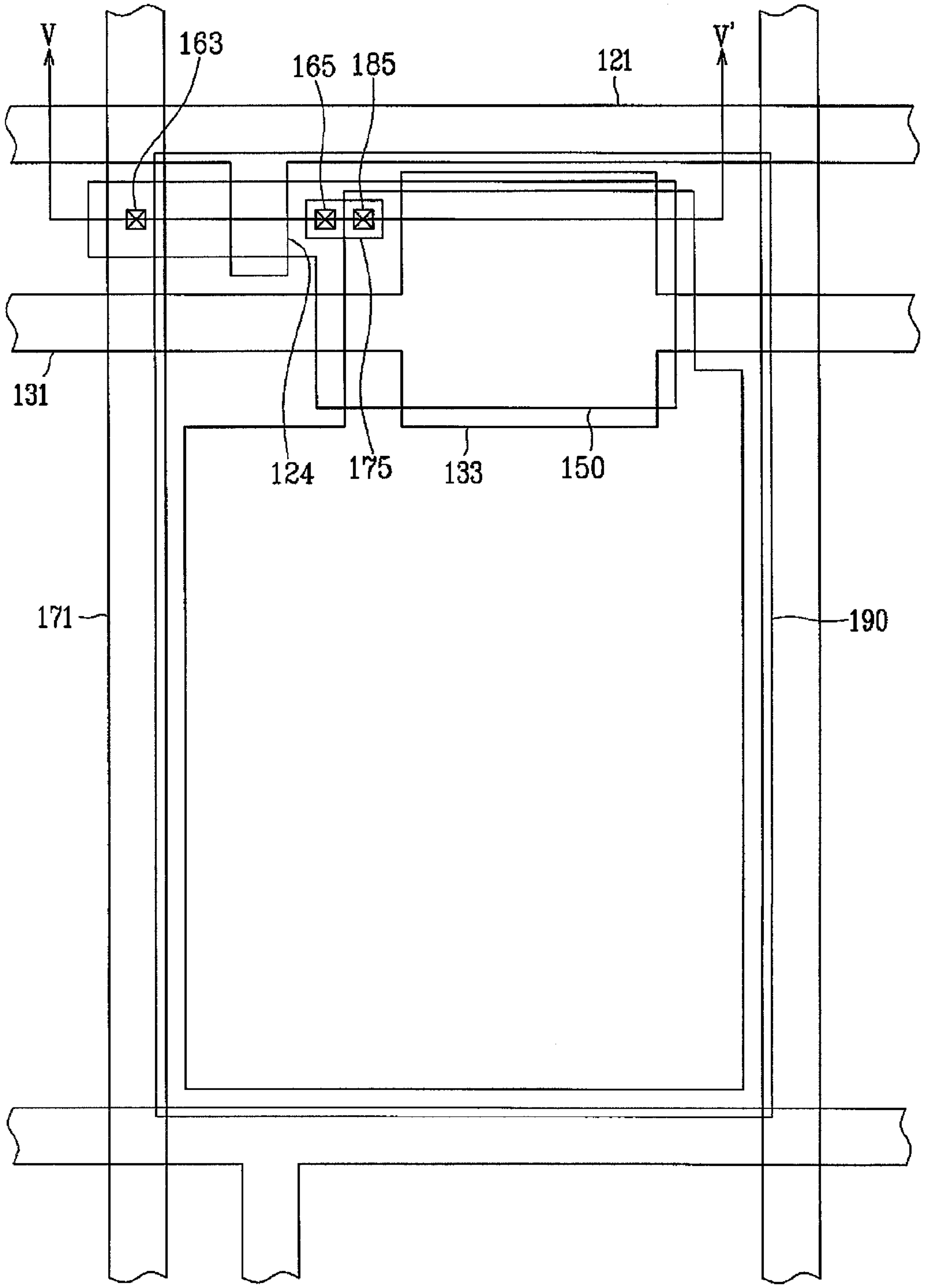
FIG. 4 is an exemplary layout view of the TFT array panel and an expanded view of an intersection area of the gate line and the data line shown in FIG. 3.
Figure 5:
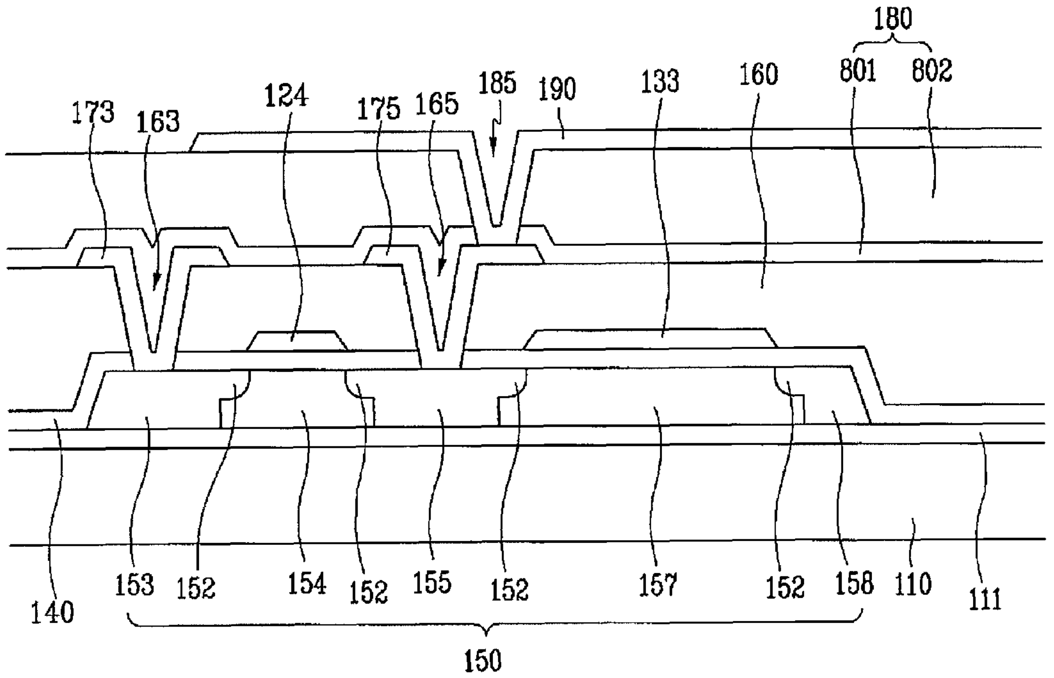
FIG. 5 is a sectional view of the TFT array panel shown in FIG. 4 taken along the lines V-V'.

FIG. 4 is an exemplary layout view of a TFT array panel according to an embodiment of the present invention, and is an expanded view of a gate line, a data line, and an intersection area thereof, and FIG. 5 is a sectional view of the TFT array panel shown in FIG. 4 taken along the lines V-V'.

Referring to FIGS. 3-5, a blocking film 111 preferably made of a silicon oxide ($SiO_2$) or silicon nitride (SiNx) is formed on a transparent insulating substrate 110. The blocking film 111 may have a dual-layered structure.

A plurality of semiconductor islands 150 preferably made of polysilicon are formed on the blocking film 111. Each of the semiconductor islands 150 includes a plurality of extrinsic regions containing conductive impurities, which include a plurality of heavily doped regions and a plurality of lightly doped regions, and a plurality of intrinsic regions containing little conductive impurities. The intrinsic regions include a channel region 154 and a storage region 157, and the highly doped regions include source and drain regions 153 and 155 separated from each other with respect to the channel region 154 and dummy regions 158. The lightly doped regions 152 are narrow and are disposed between the intrinsic regions 154 and 157 and the heavily doped regions 153, 155, and 158. In particular, the lightly doped regions 152 disposed between the source region 153 and the channel region 154 and between the drain region 155 and the channel region 154 are referred to as "lightly doped drain (LDD) regions."

A gate insulating layer 140 preferably made of silicon nitride (SiNx) is formed on the semiconductor islands 150 and the blocking film 111.

A plurality of gate conductors including a plurality of gate lines 121 and a plurality of storage electrode lines 131 are formed on an insulating substrate 110.

The gate lines 121 for transmitting gate signals extend substantially in the first direction and include a plurality of gate electrodes 124 protruding downward with respect to the gate lines 121 to overlap the channel areas 154 of the semiconductor islands 150. The gate electrodes 124 may further overlap the lightly doped regions 152. Each gate line 121 may include an expanded end portion 129 having a large area for contact with another layer or an external driving circuit. The gate lines 121 may be directly connected to a gate driving circuit for generating the gate signals, which may be integrated on the substrate 110.

The storage electrode lines 131 are supplied with a predetermined voltage such as a common voltage, and include a plurality of storage electrodes 133 that are wider than the storage electrode lines 131. The storage electrodes 133 overlap the storage regions 157 of the semiconductor islands 150.

The gate conductors 121 and 131 are preferably made of a low resistivity material including an Al-containing metal such as Al and an Al alloy. The gate conductors 121 and 131 may have a multi-layered structure including two films having different physical characteristics. One of the two films is preferably made of a low resistivity metal including an Al-containing metal for reducing signal delay or voltage drop in the gate conductors 121 and 131. The other film is preferably made of a material such as Cr, Mo, a Mo alloy, Ta, or Ti, which has good physical, chemical, and electrical contact characteristics with other materials such as indium tin oxide (ITO) or indium zinc oxide (IZO).

In addition, the lateral sides of the gate conductors 121 and 131 are inclined relative to a surface of the substrate 110 to form an angle that ranges between about 30-90 degrees.

An interlayer insulating layer 160 is formed on the gate conductors 121 and 131. The interlayer insulating layer 160 is preferably made of a photosensitive organic material having a good flatness characteristic, a low dielectric insulating material such as a-Si:C:O and a-Si:O:F formed by plasma enhanced chemical vapor deposition (PECVD), or an inorganic material such as silicon nitride and silicon oxide.

The interlayer insulating layer 160 and the gate insulating layer 140 have a plurality of contact holes 163 and 165 exposing the source regions 153 and the drain region 165, respectively.

A plurality of data conductors including a plurality of data lines 171 and a plurality of drain electrodes 175 are formed on the interlayer insulating layer 160.

The data lines 171 for transmitting data voltages extend substantially in the second direction and intersect the gate lines 121. Each data line 171 includes a plurality of source electrodes 173 connected to the source regions 153 through the contact holes 163, and an expansion (not shown).

The drain electrodes 175 are separated from the source electrodes 173 and connected to the drain regions 155 through the contact holes 165.

The data conductors 171 and 175 are preferably made of a refractory metal including Cr, Mo, Ti, Ta, or alloys thereof. They may have a multi-layered structure preferably including a low resistivity film and a good contact film. A good example of the multi-layered structure includes a Mo lower film, an Al middle film, and a Mo upper film as well as the above-described combinations of a Cr lower film and an Al—Nd upper film and an Al lower film and a Mo upper film. Another example of the multi-layered structure is a Cr lower film and a MoW upper film.

Like the gate conductors 121, 131, and 122, the data conductors 171 and 175 have tapered lateral sides relative to a surface of the substrate 110 that form angles in the range of about 30-80 degrees with respect to the surface of the substrate 110.

A passivation layer 180 is formed on the data line 171, drain electrode 175, and the interlayer insulating layer 160. The passivation layer 180 is preferably made of a photosensitive organic material having a good flatness characteristic, a low dielectric insulating material such as a-Si:C:O and a-Si:O:F formed by PECVD, or an inorganic material such as silicon nitride and silicon oxide. The passivation layer 180 includes a first insulating layer 801 made of an inorganic material and a second insulating layer 802 formed on the first insulating layer 801 and made of an organic material. The passivation layer 180 has a plurality of contact holes 185 exposing the drain electrodes 175, and a plurality of contact holes (not shown) exposing the end portions of the data lines 171.

A plurality of pixel electrodes 190, which are preferably made of at least one transparent conductor such as ITO or IZO and an opaque reflective conductor in a reflective mode or translucent mode such as Al or Ag, are formed on the passivation layer 180 or the interlayer insulating layer 160.

The pixel electrodes 190 are located in the display area D, and are physically and electrically connected to the drain electrodes 175 through the contact holes 185 such that the pixel electrodes 190 receive the data voltages from the drain regions 155 via the drain electrodes 175.

Referring back to FIG. 2, the pixel electrodes 190 supplied with the data voltages generate electric fields in cooperation with the common electrode 270 on the other panel 200, which determine orientations of liquid crystal molecules in a liquid crystal layer 3 disposed therebetween or cause currents in light emitting members (not shown) disposed therebetween.

As described above, a pixel electrode 190 and a common electrode form a liquid crystal capacitor, and a pixel electrode 190 and a drain region 155 connected thereto and a storage electrode line 131 including storage electrodes 137 form a storage capacitor.

The pixel electrodes 190 may overlap the gate lines 121 and the data lines 171 to increase an aperture ratio, particularly when the passivation layer 180 is made of a low dielectric insulator.

As described above, the TFT array panel 100 according to the embodiments of the present invention has the end portions 129 and 179 (see FIG. 3) exterior to the display area D such that the gate lines 121 and the data lines 171 are electrically connected to the gate driving IC chips 440 and the data driving IC chips 540, and the end portions 129 and 179 are connected to the test lines 125, 126*a*, and 126*b* group by group. A structure of connections of the end portions 129 of the gate lines 121 and the gate VI test lines 126*a* and 126*b* is now described with reference to FIGS. 6-8 as well as FIG. 3.

Figure 6:
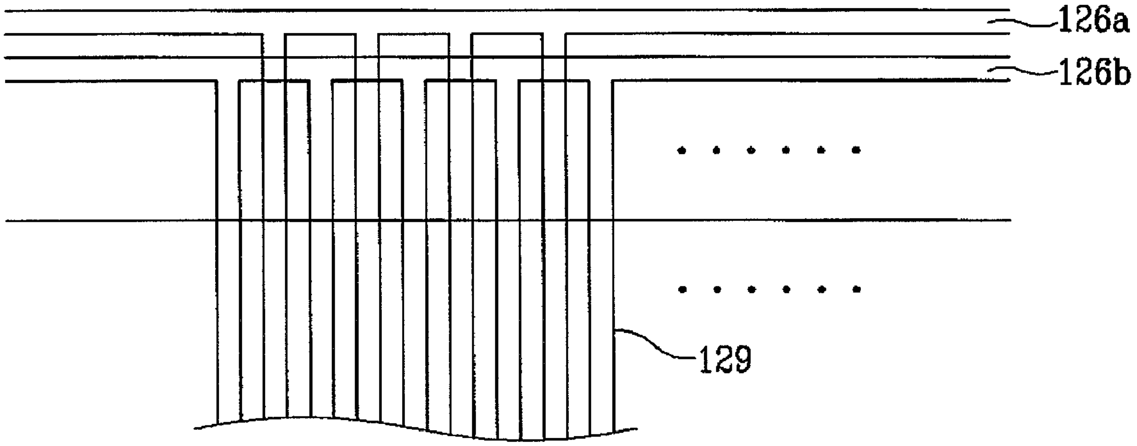
FIG. 6 is a schematic layout view of the portion A which is a connection point of a gate line and a gate VI test line in an LCD according to an exemplary embodiment of the present invention.
Figure 7:
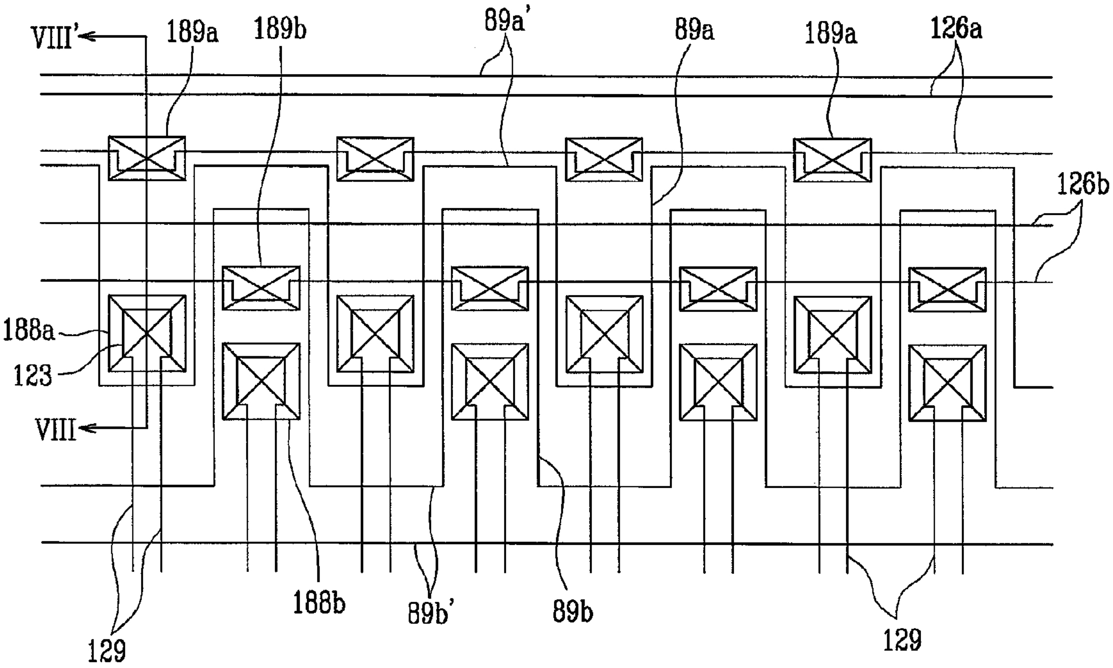
FIG. 7 is an expanded layout view of the connection A.
Figure 8:
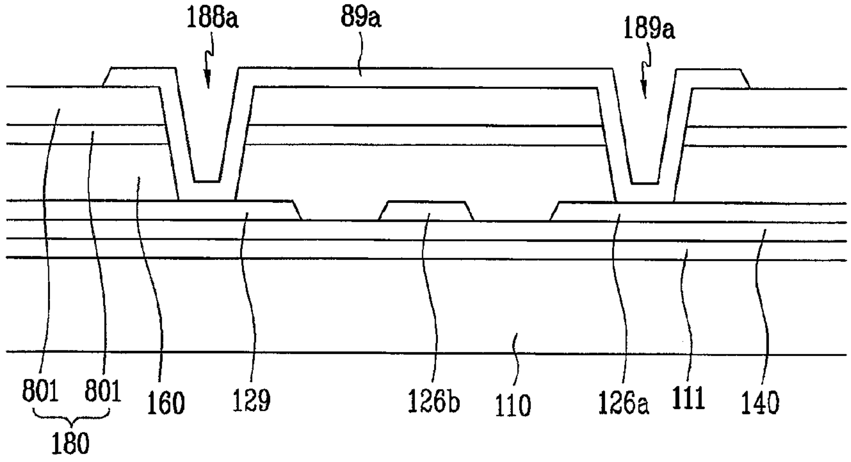
FIG. 8 is a sectional view of the TFT array panel shown in FIG. 7 taken along the line VIII-VIII'.

FIG. 6 is a schematic layout view of a portion A, which is a connection of gate lines and gate VI test lines, according to an embodiment of the present invention, FIG. 7 is an enlarged view of the connection shown in FIG. 6, and FIG. 8 is a sectional view of the TFT array panel shown in FIG. 7 taken along the line VIII-VIII'.

Referring to FIG. 6, the end portions 129 of the gate lines 121 are connected to the gate VI test lines 126*a* and 126*b*. One of the two test lines 126*a*, 126*b* is connected to the odd gate lines 121 via the end portions 129 and the other test line 126*b* is connected to the even gate lines 121.

In detail, the blocking film 111 and the gate insulating layer 140 extend toward the connection on the insulating substrate 110, and the end portions 129 of the gate lines 121 and the first and second gate VI test lines 126*a* and 126*b* are formed thereon.

The end portions 129 of the gate lines 121 extend in the first direction and have wide expansions 123.

The first and the second gate VI test lines 126*a* and 126*b* substantially extend in the second direction, and are separated from the gate lines 121. The first gate VI test line 126*a* includes protrusions protruding toward the end portions 129 and the odd gate lines 121, and the second gate VI test line 126*b* includes protrusions protruding toward the end portions 129 of the even gate lines 121. The protrusions of the first and second gate VI test lines 126*a* and 126*b* protrude in the same direction, but may protrude in an opposite direction from each other in some embodiments.

The first and the second interlayer insulating layers 801 and 802 are sequentially formed on the end portions 129 of the gate lines 121, the first and the second gate VI gate lines 126*a* and 126*b*, and the exposed gate insulating layer 140.

The first and the second interlayer insulating layers 801 and 802 have a plurality of contact holes 188*a*, 188*b*, 189*a*, and 189*b* exposing the expansions of the end portions 129 of the gate lines 121, and the protrusions of the first and the second gate VI test lines 126*a* and 126*b*, respectively. The contact holes 188*a*, 188*b*, 189*a*, and 189*b* preferably expose border lines of the expansions of the end portions 129 of the gate lines 121, and the protrusions of the first and the second gate VI test lines 126*a* and 126*b*.

A plurality of first and second conductive layers 89*a* and 89*b* are formed on the second interlayer insulating layer 802 in the layer identical to the pixel electrodes 190.

A plurality of the first conductive layers 89*a* are connected to each other via first auxiliary test lines 89*a*', and they electrically and physically connect the end portions 129 of the odd gate lines 121 to the first gate VI test lines 126*a* via the contact holes 189*a* and 188*a*. The first conductive layer 89*a* form protrusions of the first auxiliary test lines 89*a*', which completely cover the contact holes 189*a* and 188*a*.

A plurality of the second conductive layers 89*b* are connected to each other via first auxiliary test lines 89*b*', and electrically and physically connect the end portions 129 of the even gate lines 121 to the second gate VI test lines 126*b* via the contact holes 189*b* and 188*b*. The second conductive layer 89*b* forms protrusions of the second auxiliary test lines 89*b*', which completely cover the contact holes 189*b* and 188*b*.

In the present invention, a plurality of the respective first and second conductive layers 89*a* and 89*b* are commonly connected to the first and second auxiliary test lines 89*a*' and 89*b*', thereby completely covering the contact holes 188*a*, 189*a*, 188*b*, and 189*b* for protection as well as preventing disconnection of the first and the second gate VI test lines 126*a* and 126*b*. Additionally, corrosion by the etchant or poor contact is prevented to increase reliability of the connection.

Figure 9:
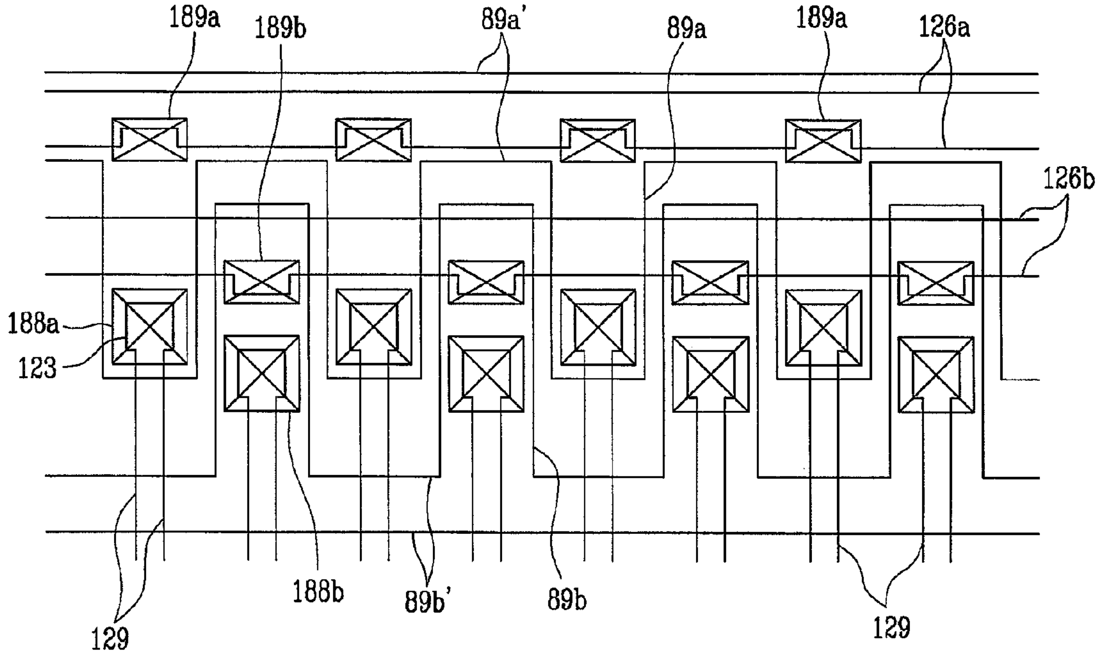
FIGS. 9 and 10 are schematic views of connections of a TFT array panel for an LCD according to other embodiments of the present invention.

FIG. 9 is a layout view of a structure of a connection in a TFT array panel for an LCD according to another embodiment of the present invention.

Referring to FIG. 9, most of the structures of a TFT array panel according to the present embodiment of the present invention are identical to those in FIGS. 7 and 8. That is, the end portions 129 of the gate lines 121 extend in the first direction and have wide expansions 123. The first and the second gate VI test lines 126*a* and 126*b* substantially extend in the second direction, and are separated from the gate lines 121. The first gate VI test line 126*a* includes protrusions protruding toward the end portions 129 and the odd gate lines 121, and the second gate VI test line 126*b* includes protrusions protruding toward the end portions 129 of the even gate lines 121. The first and the second interlayer insulating layers 801 and 802 are sequentially formed on the end portions 129 of the gate lines 121, the first and the second gate VI gate lines 126*a* and 126*b*, and the exposed gate insulating layer 140.

The first and the second interlayer insulating layers 801 and 802 have a plurality of contact holes 188*a*, 188*b*, 189*a*, and 189*b* exposing the expansions of the end portions 129 of the gate lines 121, and the protrusions of the first and the second gate VI test lines 126*a* and 126*b*, respectively. A plurality of first and second conductive layers 89*a* and 89*b* are formed on the second interlayer insulating layer 802, and form protrusions of the first auxiliary test lines 89*a*' and protrusions of the second auxiliary test lines 89*b*', respectively.

However, the first gate VI test lines 126*a* have concave protrusions, that is, protrusions protruding in a direction away from the gate lines, unlike those shown in FIGS. 7 and 8.

Figure 10:
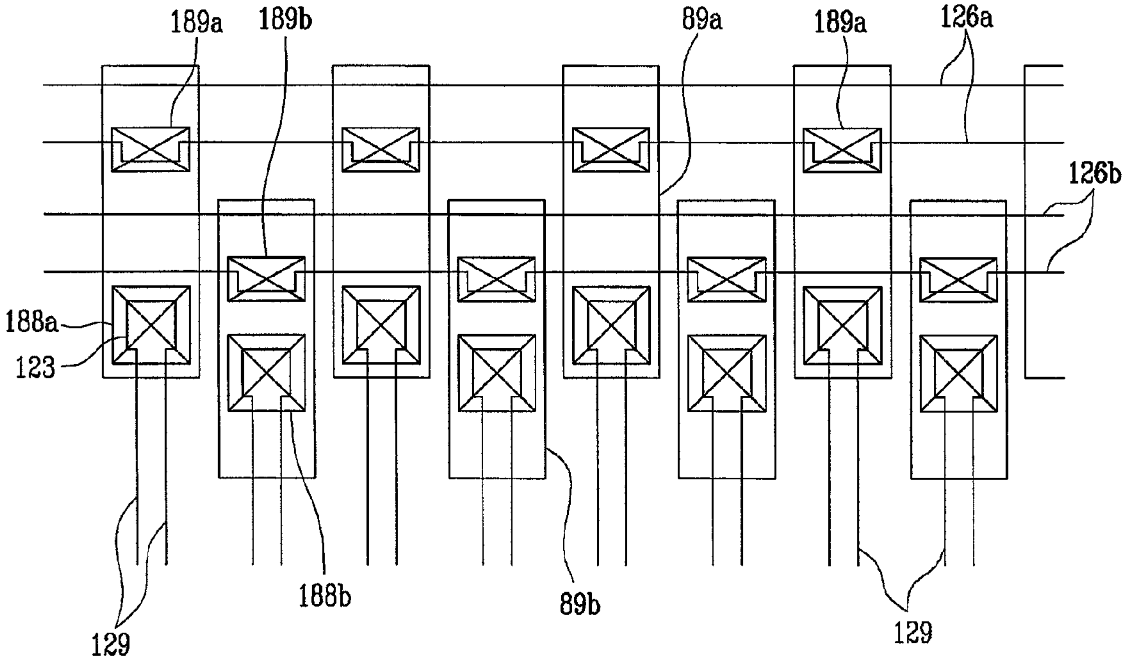

FIG. 10 is a layout view of a structure of a connection in a TFT array panel for an LCD according to still another embodiment of the present invention.

Referring to FIG. 10, most of the structures of a TFT array panel according to the present embodiment of the present invention are identical to those in FIGS. 7 and 8.

However, the first and the second auxiliary test lines are not employed in the embodiment shown in FIG. 10, and thus a plurality of the respective conductive layers 89*a* and 89*b* connecting the end portions 129 of the gate lines 121 to the first and the second gate VI test lines 126*a* and 126*b* are separated from each other.

The above-described connection structures can be employed to a connection for connecting the data lines 171 to the data VI test lines 125, and auxiliary conductive layers may be added to end portions of the first and the second auxiliary test lines 89*a*' and 89*b*' or end portions 129 of the gate lines 121 in the same layer as the data lines 171.

Additionally, the above inventions may be adapted to other flat panel display devices such as the OLED display.

In the present invention, the protrusions of the test lines are disposed in the same direction toward the signal lines, or the conductive layers connecting the test lines to the signal lines are connected to each other, thereby preventing the disconnection of the test lines or the test lines and the signal lines. Accordingly, the reliability of the connection is increased, the contact resistance of the connection is minimized, and characteristics of the LCD are improved.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A thin film transistor array panel, comprising:
- a plurality of gate lines;
- a plurality of data lines intersecting the gate lines;
- a plurality of switching elements respectively connected to the gate lines and the data lines;
- a plurality of pixel electrodes respectively connected to the switching elements;
- at least one test line disposed near end portions of the gate lines or the data lines;
- at least one contact hole exposing the at least one test line; and
- at least one auxiliary test line having a plurality of conductive layers extending therefrom, wherein each of the conductive layers contacts the at least one test line.

2. The thin film transistor array panel of claim 1, wherein the end portions of the gate lines or data lines have expansions, respectively, and the at least one test line includes protrusions corresponding to the expansions.

3. The thin film transistor array panel of claim 2, wherein the at least one contact hold exposes border lines of the expansions and the protrusions.

4. The thin film transistor array panel of claim 3, wherein the conductive layers completely cover the at least one contact hole.

5. The thin film transistor array panel of claim 4, wherein the at least one test line includes a first test line and a second test line and wherein the at least one auxiliary test line comprises a first auxiliary test line and a second auxiliary test line.

6. The thin film transistor array panel of claim 5, wherein the protrusions of the first test line and the second test line protrude in the same direction toward the end portions of the gate lines.

7. The thin film transistor array panel of claim 5, wherein the protrusions of the first test line and the second test line protrude in directions opposite of each other.

8. The thin film transistor array panel of claim 5, wherein the first auxiliary test line, the second auxiliary test line and the pixel electrodes are formed in a pixel electrode layer.

9. The thin film transistor array panel of claim 5, wherein the first test line and the second test line are formed on a same layer as the gate lines.

10. The liquid crystal display of claim 1, further comprising a cutting line which is disposed proximate to the end portions of the gate lines or the data lines.

11. A liquid crystal display, comprising:
- a plurality of gate lines;
- a plurality of data lines intersecting the gate lines;
- a plurality of switching elements respectively connected to the gate lines and the data lines;
- a plurality of pixel electrodes formed in a pixel electrode layer, the pixel electrodes being respectively connected to the switching elements;
- at least one test line disposed near end portions of the gate lines or the data lines;
- at least one auxiliary test line formed in the pixel electrode layer and having a plurality of conductive layers extending therefrom, each of the conductive layers contacting the at least one test line.

12. The liquid crystal display of claim 11, wherein the end portions of the gate lines or the data lines have expansions, respectively, and the at least one test line includes protrusions corresponding to the expansions.

13. The liquid crystal display of claim 11, wherein the at least one auxiliary test line includes a first auxiliary test line and a second auxiliary test line.

14. The liquid crystal display of claim 13, wherein the protrusions of the first test line and the second test line protrude in the same direction toward the end portions of the gate lines.

15. The liquid crystal display of claim 13, wherein the protrusions of the first test line and the second test line protrude in directions opposite of each other.

16. The liquid crystal display of claim 11, wherein the auxiliary test lines are formed on a same layer to that of the pixel electrodes.

17. The liquid crystal display of claim 13, wherein the first test line and the second test line are formed in a layer in which the gate lines are formed.

18. The liquid crystal display of claim 11, wherein the conductive layers connect the at least one test line via at least one contact hole.

19. The liquid crystal display of claim 18, wherein the conductive layers completely cover the at least one contact hole.

20. The liquid crystal display of claim 11, further comprising a cutting line which is disposed proximate to the end portions of the gate lines or the data lines.

* * * * *